United States Patent Office 3,435,508
Patented Apr. 1, 1969

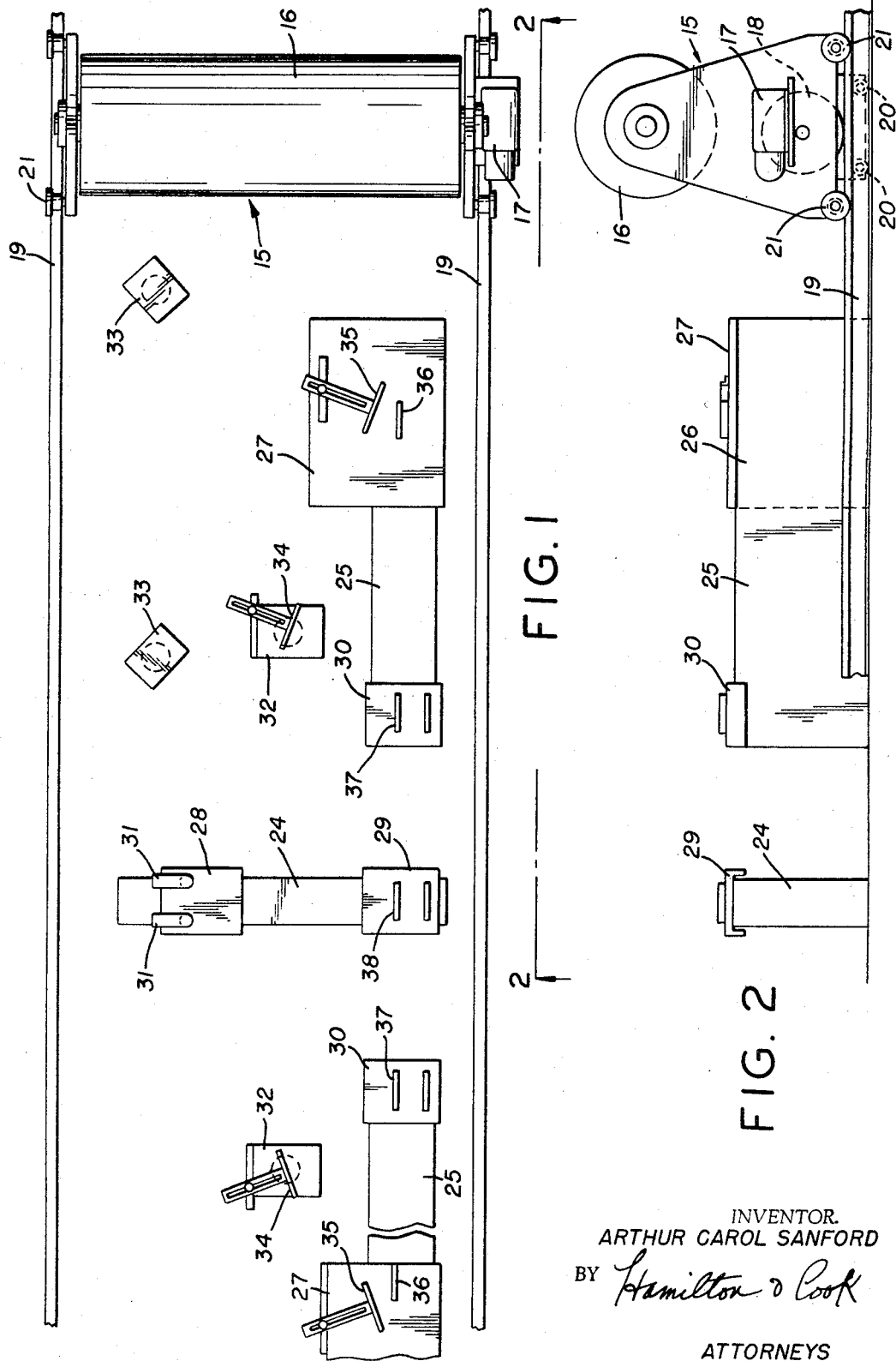

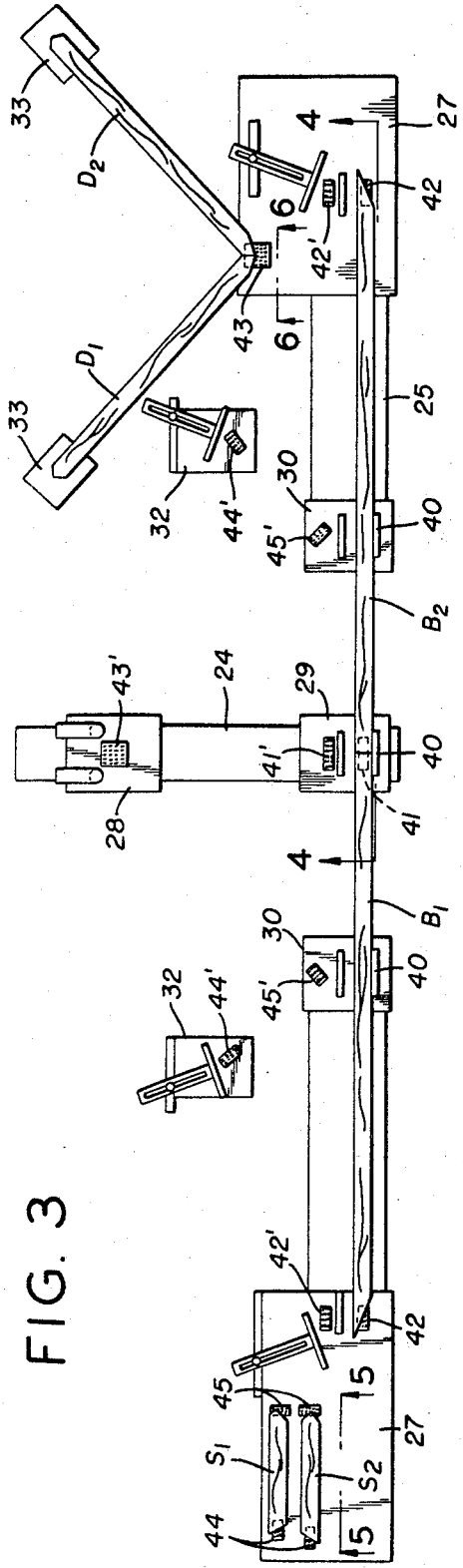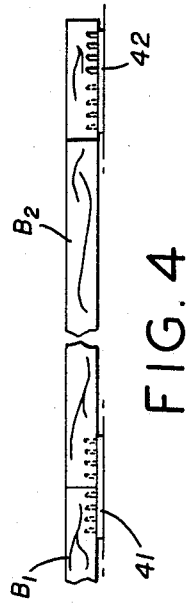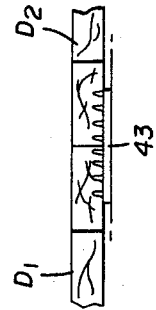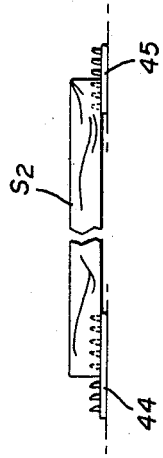

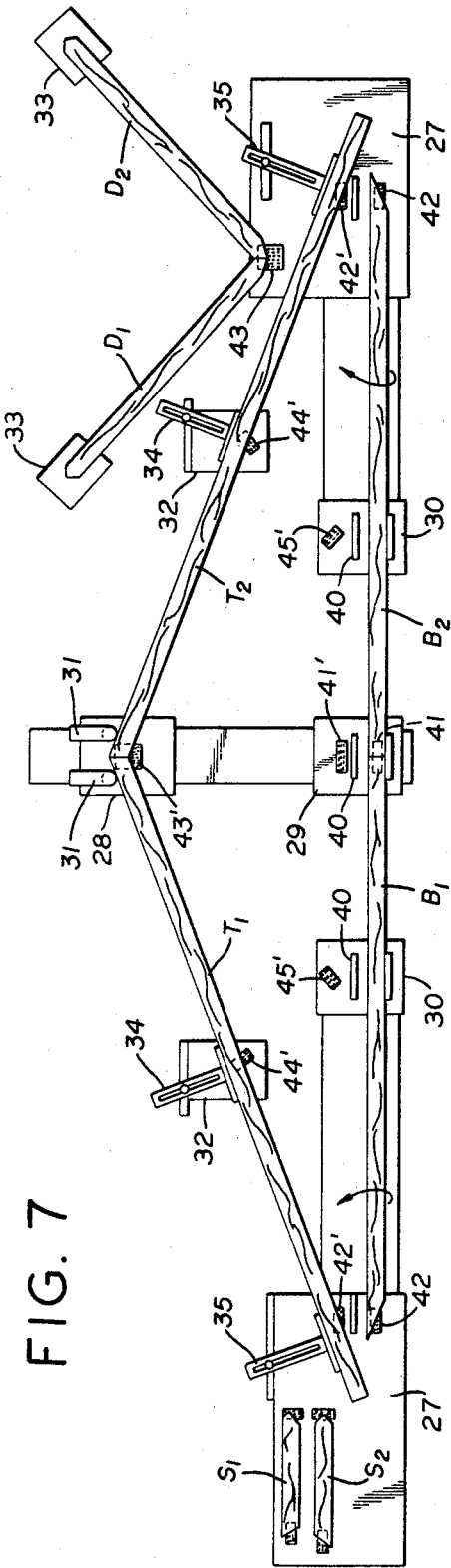

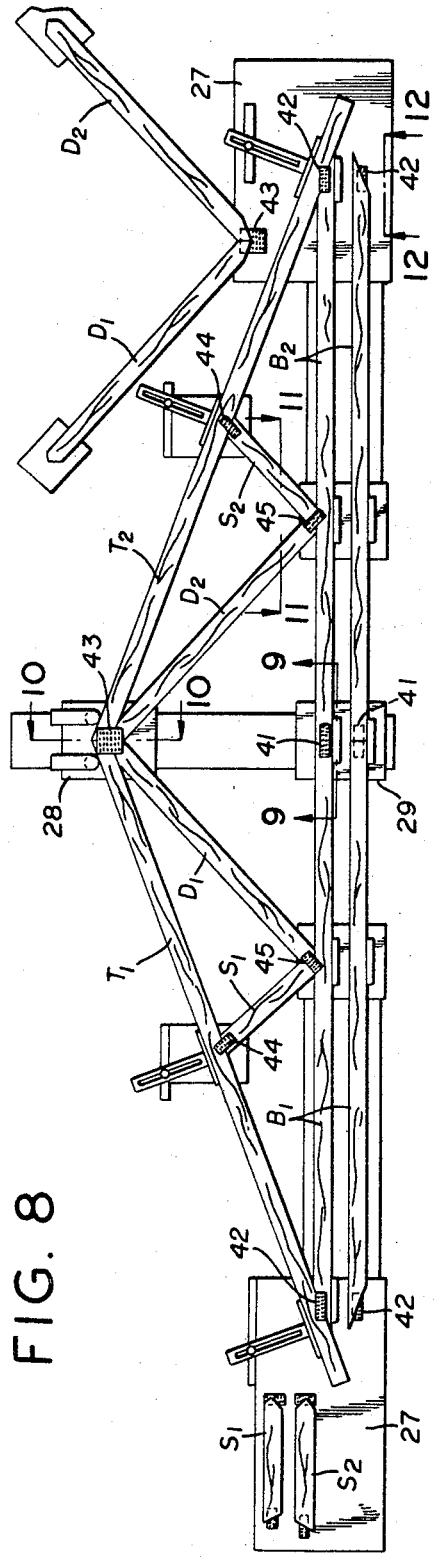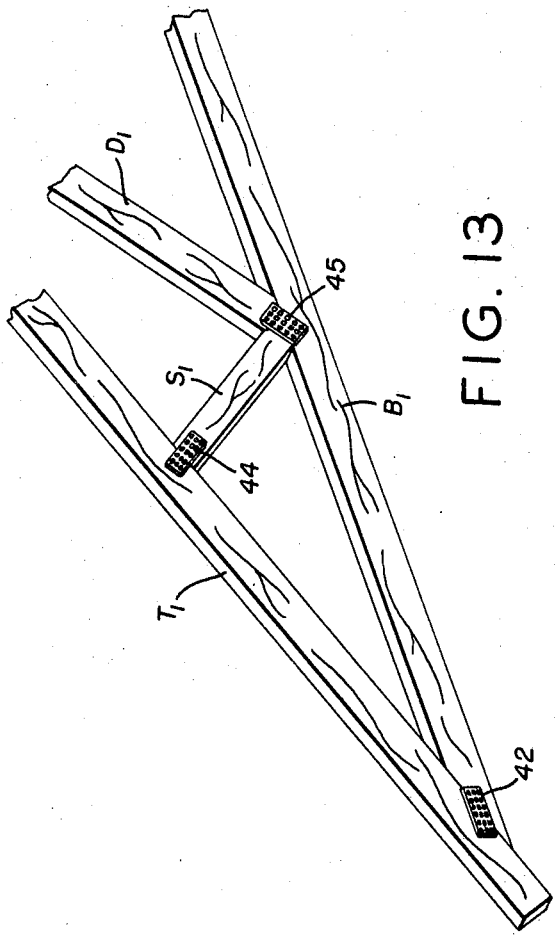

3,435,508
METHOD OF FABRICATING TRUSSES
Arthur Carol Sanford, Palm Beach, Fla.
(P.O. Box 1177, Pompano Beach, Fla. 33061)
Filed Mar. 23, 1966, Ser. No. 536,774
Int. Cl. B23p 11/00
U.S. Cl. 29—432                              7 Claims

ABSTRACT OF THE DISCLOSURE

The method of fabricating the trusses using a single roller press which in one pass fully embeds the teeth of the bottom plates placed under the joints of the assembled truss components and fully embeds the teeth of the top plates already embedded in certain components over the joints, said top plate teeth having been embedded as bottom plate teeth in certain non-assembled components during a previous pass for fully embedding the top and bottom plate teeth at all joints in an assembled truss.

---

The present invention relates generally to the fabrication of wooden trusses, and more particularly wooden trusses having their components in one plane and joined together by toothed metal connector plates.

The connector plates having a multiplicity of teeth are applied to both sides of each joint between the truss components and the teeth pressed into the wood until the flat part of the plate is in abutment with the surfaces of the joined wooden members. This distributes the stress at each joint over the entire area of the two plates, making a very strong joint.

A prior method of fabricating such trusses is to lay out the components on a table jig, place a connector plate over each joint, and tack the plates in position by hand driving a few nails through holes in the plates However, in order to fully embed the teeth, a substantial amount of pressure is required, such as exerted by a relatively heavy stamping or roller press. Before the pressing operation, the entire truss with the plates tacked on one side, is turned over and plates tacked on the opposite sides of the joints. Then the plates on both sides of each joint are fully embedded by successively positioning the joints under a stamping press or passing the partially constructed truss through a roller press. This method is obviously slow, laborious and expensive.

It has been proposed to provide jigging means to position the plates on both sides of each joint and provide a plurality of stamping presses, one for each joint to avoid turning over the entire truss, but this obviously requires expensive equipment to hold all the plates in position and a number of expensive individual presses.

My prior Patent No. 3,212,694 discloses a truss fabricating machine in which one or more trusses are assembled with plates positioned on top and bottom sides of the joints and the joints supported by pressure pads. A traveling or gantry roller press passes over the top of the truss to partially set the teeth of the top and bottom plates into the wood. The partially constructed trusses are then passed between rolls of a stationary roller press to fully embed the teeth of the plates.

While the gantry press can, if desired, be set to fully embed the teeth of the bottom plates, it cannot satisfactorily fully and uniformly embed the teeth of the top plates, because the roller contacts and moves over each plate along a tangent line, and the plate inevitably tends to curl or curve upwardly at its ends behind and in advance of the roller. This does not occur in the bottom plates because the pressure of the roll is distributed through the wood joint and over the area of the bottom plate. By pressing the top plates in two stages, first with the gantry roller and next with the double roller, the tendency of the top plates to curl is minimized. More uniform full embedment of the teeth is accomplished by using a stamping press rather than the double roller, but this requires successive pressing operations at each joint.

It is an object of the present invention to provide an improved method of fabricating a wooden truss having its components joined on opposite sides by toothed metal connector plates, using one pass of rolling pressure to completely and uniformly set the teeth.

Another object is to provide a novel sequence of layout operations whereby all the plates have their teeth fully embedded in at least one of the joined components by applying roller pressure directly to the top of the component with the plate on the bottom.

A further object is to provide a novel method of fully embedding the teeth of plates on the undersides of certain components for use in succeeding trusses during the same pass of rolling pressure which is used to complete the fabrication of a complete truss.

A still further object is to provide an improved method of fabricating a tier of wooden trusses having their components joined on opposite sides by toothed metal connector plates, using a single pass of rolling pressure to completely and uniformly set the teeth of all plates.

The foregoing and other objects are accomplished by the novel method of the present invention which comprises passing a rolling press over the tops of the truss components to embed the teeth of plates on the bottom sides thereof, certain of said components with plates embedded on their bottom sides having been inverted and placed in assembled position to make a finished truss in one pass of the press.

Referring to the drawings:

FIG. 1 is a schematic plan view of a preferred embodiment of apparatus for carrying out the invention, showing the jig supports on which the truss is assembled, and the rolling press or gantry.

FIG. 2 is a partial elevation thereof.

FIG. 3 is a schematic plan view of the jig supports with plates positioned thereon for embedment at the bottom sides of the truss joints, and separated components with bottom plates embedded therein before being inverted and placed in assembled position.

FIG. 4 is a fragmentary elevation at line 4—4 of FIG. 3.

FIG. 5 is a fragmentary elevation at line 5—5 of FIG. 3.

FIG. 6 is a fragmentary elevation at line 6—6 of FIG. 3.

FIG. 7 is a view similar to FIG. 3 showing the top chord components in assembled position over the previously positioned plates.

FIG. 8 is a similar view showing the previously separated components with bottom-attached plates inverted and in assembled position, and additional separated components with plates positioned thereunder for use in assembling the next successive truss.

FIG. 9 is a fragmentary elevation at line 9—9 of FIG. 8.

FIG. 10 is a fragmentary sectional view at line 10—10 of FIG. 8.

FIG. 11 is a fragmentary sectional view at line 11—11 of FIG. 8.

FIG. 12 is a fragmentary elevation at line 12—12 of FIG. 8.

FIG. 13 is an enlarged fragmentary perspective view of the finished truss.

Referring to FIGS. 1 and 2, the rolling or gantry press indicated as a whole at 15 may be of the construction fully illustrated and described in my prior Patent No. 3,212,694, except that the roller 16 is preferably of much larger diameter in order to minimize the curling tendency of plates contacted directly by the roller. A diameter of approximately 36 inches is preferred, although the diameter may be varied without departing from the scope of the invention.

Similarly to the construction set forth in Patent No. 3,212,694, the electric motor 17 drives the roller 16, which in turn drives wheels 18 frictionally engaging the tracks 19 straddling the jig supports. Bogie wheels 20 engage the undersurfaces of the track flanges to hold the gantry down on the track as the roller 16 passes over the truss components, and spaced balance rolls 21 engage the top surfaces of the tracks.

The jig supports preferably include base pads of foundation supports 24 and 25 extending generally at right angles to each other between the tracks 19, the pad 24 extending under the peak joint of the assembled truss and the midpoint of the bottom chord, and the pads 25 are aligned at right angles to pad 24 and extending under the bottom chord on either side of pad 24. The pads 25 terminate at their outer ends in enlarged portions 26 having support plates 27 thereon. Support plates 28 and 29 are slidably mounted on pad 24 for accommodating trusses of various heights, and plates 30 are slidably mounted on pads 25 for accommodating the interior joints on the bottom chords of trusses of various spans. The large plates 27 accommodate the heel joints of trusses of various spans.

In the drawings the assembly of a simple W type of truss best seen in FIG. 8 is depicted, but it will be understood that king post trusses and a variety of other types and sizes of trusses may be fabricated according to the present invention.

In addition to the base pads 24, 25 and 26, additional supporting tables 32 (preferably movable) are shown for supporting interior joints on the top chords of the truss shown. Additional movable tables may be provided for the interior joints of other types of trusses as required. Still other additional tables 33 are provided for a purpose to be described.

The support plate 28 has clamping means preferably in the form of two arms 31 for abutting the top chords on either side of the apex of the truss. Preferably, the support 28 is provided with adjusting means (not shown) to apply inward pressure against the top chords after the truss components are assembled, to insure tight joints between the truss components. Adjustable T-shaped abutment arms 34 and 35 are provided on tables 32 and support plates 27, respectively, for abutting the top chords of the assembled truss. Fixed aligned stops 36, 37 and 38 are provided on support plates 27, 30 and 29, respectively, for abutting the bottom sides of the bottom chord of the assembled truss.

The method of the present invention is designed to make a finished truss with a single pass of the roller press, and this is accomplished by applying plates to the undersides of certain separated components of the next truss during the same pass that completes the assembly of the finished truss by embedding plates on both sides of the various joints. Hence, at the start of a continuous operation of making successive trusses, it is necessary to make one preliminary pass to apply plates to the undersides of the components to be inverted and assembled into the first complete truss.

FIG. 3 illustrates the setup for this preliminary pass, and this same setup with like components is made prior to each pass over an assembled truss. After the assembled finished truss is removed, these separated components, with plates embedded in the bottom sides are inverted and positioned in the next truss assembly.

Accordingly, the setup of FIG. 3 also shows the position of the separated components after removal of a previous finished truss and before inverting the separated components with attached plates and positioning them in the next truss assembly.

The separated components shown in FIG. 3 comprise a bottom chord preferably made up of two parts $B_1$ and $B_2$ having their inner ends abutting at the midpoint of the bottom chord and their outer ends cut on the angle of the top chords of the finished truss. Guides 40 on support plates 29 and 30 are used to align the parts $B_1$ and $B_2$. Other components are the diagonals $D_1$ and $D_2$ having their inner ends mitered and in abutment for making the peak joint with the top chords, and strut members $S_1$ and $S_2$ having both ends mitered for fitting properly in the finished truss. The location of all of these components in the finished truss is shown in FIG. 8.

Prior to passing the rolling press 15 over the separated components toothed plates are properly placed in teeth-up position under the ends of the various components so as to have part of the teeth of each plate embedded in the components when the roller passes thereover in contact with the top surfaces of the components. Thus, a plate 41 joins components $B_1$ and $B_2$, and plates 42 have portions embedded in the ends of $B_1$ and $B_2$ and portions extending therefrom. Plate 43 has a portion connecting the ends of diagonals $D_1$ and $D_2$ and a portion extending therefrom. Plates 44 and 45 have portions embedded in the ends of struts $S_1$ and $S_2$ and portions extending therefrom.

When the truss components are placed in assembly position, plates are placed in teeth-up position under each of the joints before the press rolls over the assembly. Thus, a plate 41' is placed teeth-up on plate 29 in position to be immediately below plate 41 and plates 42' are placed to be below plates 42 when the bottom chord $B_1$, $B_2$ is inverted and placed inside and in abutment with the stops 36, 37 and 38. Similarly, plates 43', 44' and 45' are placed to be below plates 43, 44 and 45, respectively, in the assembled truss position.

Referring to FIG. 7, the first step in assembling a truss is preferably placing the top chord components $T_1$ and $T_2$ in position against the inside of arms 31 and abutment arms 34 and 35 which are set to the proper position for the size and pitch of truss desired. Next, the connected diagonals $D_1$ and $D_2$ are inverted and placed in the position of FIG. 8 with plate 43 directly over plate 43', and then struts $S_1$ and $S_2$ are inverted and placed in the position of FIG. 8 with plates 44 and 45 directly over plates 44' and 45' and bottom chord $B_1$, $B_2$ is inverted with plates 41 and 42 over plates 41' and 42'. Then the separated components $B_1$, $B_2$, $D_1$, $D_2$, $S_1$ and $S_2$ for the next truss, with plates properly located thereunder, are placed in position, as indicated in FIG. 8. After adjusting the support plate 28 to cause the clamp arms 31 to exert an inward pressure on the top chords $T_1$ and $T_2$ to assure tight joints throughout the truss, the press 15 is passed over the assembly and the separated components adjacent thereto. A single pass completes the embedment of the teeth of all of the top and bottom plates in the assembled truss, and also embeds the teeth of the bottom plates into the separated components for the next truss.

While portions of the top plates are embedded by contact with the roller 15 during the single pass over the assembled truss, in every case a substantial portion of each top plate previously has been fully embedded into at least one component as a bottom plate during the previous pass, so that the tendency of the plate to curl as the roller 16 passes thereover is greatly minimized. Furthermore, as compared with the press disclosed in my prior Patent 3,212,694, the diameter of roller 16 has been greatly increased, which further minimizes any tendency of the plates to curl. The net result is that the tendency to curl of the top plates when contacted by the roller 16 is not material. At the same time, all of the plates on the bottom side of the truss are embedded by the pressure transmitted from the roll through the wood of the components, so that there is no tendency to curl of any of the bottom plates.

While I have shown and described the improved method as applied to making a single truss with one pass of the roller press, it will be apparent that multiple trusses and multiple components may be rolled with one pass by stacking several like separated components one on top of the other with bottom plates under each layer, and inverting and assembling the components to form a stack of assembled trusses of the same number of layers in the same manner as described for assembling one truss.

Thus, referring to FIG. 8, a plurality, for example five, assembled trusses and plates and five sets of the separated components in vertically stacked or tiered relation can be rolled with one pass of the press to fully embed the teeth of all the plates into the wood components. In such case only the top plates of the top components would directly be contacted by the roller.

It will be seen that an improved method has been provided for fabricating a wooden truss whereby connector plates are embedded on opposite sides of the truss joints by making one pass of a rolling press over one side of the truss.

Various modifications and changes in details of the improved method are comprehended within the scope of the appended claims.

What is claimed is:

1. The method of fabricating a truss having wooden components with toothed connector plates embedded in both sides of each joint, comprising placing bottom connector plates at the joint locations for one side of the finished truss, assembling the truss components with their joints positioned over said bottom plates, passing a rolling press over said assembled components, and at the same time passing said press over certain non-assembled like components of another truss at adjacent locations to embed bottom plates at joint locations thereon, and then inverting said like components and placing them in a successive truss assembly to supply the top plates therefor during a successive pass of said roller press.

2. The method of claim 1 in which at least one of the assembled components at each joint has a top plate previously embedded therein.

3. The method of claim 1 in which said like components comprise the bottom chord and interior components of the truss.

4. The method of claim 1 in which the truss assembly components are assembled in stacks of a desired number of layers, and the like components are stacked in the same number of layers at adjacent locations, before passing the rolling press thereover.

5. In a method of fabricating a truss having wooden components with toothed connector plates on both sides of the joints, the steps of connecting at least one of the plates to the bottom of one of the components forming one of the joints and connecting at least one of the other plates to the bottom of said one joint by rolling pressure applied directly to the top of the component and to the top of said one joints to embed the teeth of the plates therein, and inverting certain of said components with attached plates and placing them in truss assembly position for forming the finished truss by a single pass of rolling pressure applied to the top thereof.

6. The method of claim 5 in which plates are connected to the bottom side of certain components to be used in the next successive truss during the same pass of rolling pressure which forms the finished truss.

7. The method of claim 5 in which the rolling pressure is applied to truss components stacked in a desired number of layers to embed the teeth of a plate on the bottom of each component, and the inverted components are stacked in the same number of layers in truss assembly position.

References Cited
UNITED STATES PATENTS 3,212,694    10/1965    Sanford _____ 227—152

ANDREW R. JUHASZ, *Primary Examiner.*

G. WEIDENFELD, *Assistant Examiner.*